United States Patent

[11] 3,620,480

[72] Inventor Austin A. Knox
White Plains, N.Y.

[21] Appl. No. 725,696
[22] Filed May 1, 1968
[45] Patented Nov. 16, 1971

[73] Assignee Dict-O-Tape Inc.
Brooklyn, N.Y.

[54] LOW-FRICTION MAGNETIC TAPE CARTRIDGE
7 Claims, 5 Drawing Figs.

[52] U.S. Cl. ........................................................ 242/199
[51] Int. Cl. ........................................................ G11b 23/10
[50] Field of Search ............................................ 242/55.13, 55.19 A, 71.2, 71.1, 199, 200, 198, 197, 194

[56] References Cited

UNITED STATES PATENTS

| | | | |
|---|---|---|---|
| 3,065,922 | 11/1962 | Ballauf | 242/55.13 |
| 3,111,281 | 11/1963 | Sinkewitsch | 242/55.13 |
| 3,269,671 | 8/1966 | Cole, Jr. | 242/55.19 A |
| 3,288,390 | 11/1966 | Kato | 242/71.2 |
| 3,291,409 | 12/1966 | McClellan | 242/55.13 X |
| 3,325,113 | 6/1967 | Yamamura et al. | 242/71.2 |

*Primary Examiner*—George F. Mautz
*Attorney*—Howard C. Miskin

ABSTRACT: A magnetic recording tape cartridge (FIG. 2) having a tape hub 12 which supports a roll of magnetic tape 15 in spaced relation to the inside surfaces of the cartridge casing 10.

INVENTOR.
AUSTIN A. KNOX
BY Curtis Ailes
ATTORNEY

INVENTOR.
AUSTIN A. KNOX
BY Curtis Ailes
ATTORNEY

LOW-FRICTION MAGNETIC TAPE CARTRIDGE

This invention relates to tape cartridges for magnetic recording tape for recording speech and sound. The invention is particularly useful in magnetic tape cartridges of the type which are very small and thin and which are sometimes currently referred to as "cassettes."

In magnetic tape cartridges, and particularly in the compact type of magnetic tape cartridges known as cassettes, it is quite common to save space in the thickness dimension of the cartridge by omitting axially extending flanges on the tape reels, providing only a drive hub upon which the tape is wound. An even more important reason for omitting the flanges on the tape reels is to permit the reels to be closely spaced together such that the tape wound upon the reels can share the same space. For instance, when one reel is completely filled, and the other is empty, the tape on the full reel extends radially into the space vacated by the removal of tape from the empty reel. This means that the side edges of the tape, after winding, are supported only within the cartridge, and are not supported by reel flanges. The sides of the walls of the cartridges nevertheless protect the tape from mechanical damage or unraveling due to outside mechanical forces or interference. It is customary in such a structure to provide a tape hub having an axial dimension substantially equal to the width of the tape, with the hub and the tape both axially supported and frictionally engaging with the inner surface of the cartridge casing. This system works reasonably well but it does present problems. For instance, the frictional engagement of both the hub and the tape with the inside of the casing provides considerable frictional resistance to rotation, increasing as the tape winds up to become a larger tape roll.

It is an important object of the present invention to provide an improved magnetic tape cartridge of the type employing a tape reel consisting only of a hub without radial said flanges which has greatly reduced friction resisting the rotation of the tape hub and tape roll.

It is another important object of the present invention to provide a reduced friction recording tape cartridge in which the friction opposing the rotation of the tape hub is substantially constant and does not vary substantially with the quantity of tape wound upon the tape hub.

Various structures have been employed to try to minimize the friction in magnetic tape cartridges of the above description. One frequently used procedure is to provide within the casing on each side of the roll of tape a special liner of material noted for its low friction characteristic. A material sometimes used is a thin film of polytetrafloroethene. This material is effective for this purpose, but it is extremely expensive. Furthermore, even with this special liner, the frictional force increases as the roll of tape increases in size.

Accordingly, it is another object of the invention to provide an improved magnetic tape cartridge of the above description wherein a low friction characteristic is achieved without the employment of special low friction casing lining materials.

Further objects and advantages of the invention will be apparent from the following description and the accompanying drawings.

In carrying out the invention to achieve the above objects there may be provided a magnetic recording tape cartridge including an outer casing for enclosing the magnetic tape and a tape reel supported within the casing. The tape reel consists only of a hub having a cylindrical outer rim without radial side flanges. The casing has substantially parallel inner surfaces spaced apart by a dimension substantially greater than the width of the magnetic tape. The casing also includes a guide for the magnetic tape to center the tape as it is wound upon the outer rim of the hub so that the wound tape is spaced away from the parallel inner surfaces, and means for radially centering the hub. The axial dimension of a predetermined annular portion of the hub is only slightly smaller than the dimension between the portions of the inside surfaces of the casing adjacent to the predetermined annular portion of the hub to provide a loose supporting fit for the hub.

Figure 3:
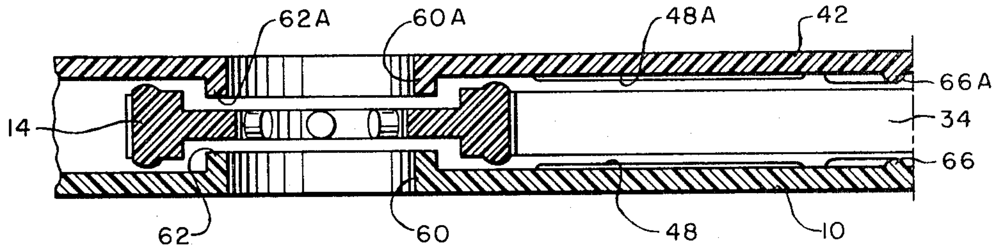
FIG. 3 is a sectional view taken at section 3—3 in FIG. 1, but illustrating the structure with the cover in place.
Figure 5:
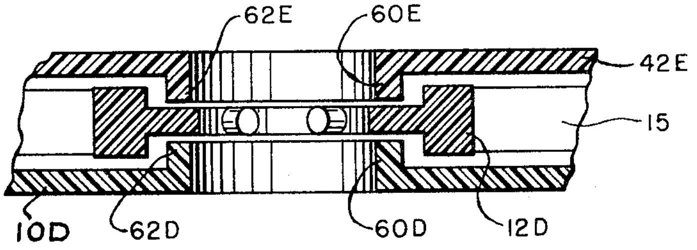

And FIG. 5 is a sectional view corresponding to the sectional view of FIG. 3, but illustrating another alternative embodiment of the invention.

Figure 1:
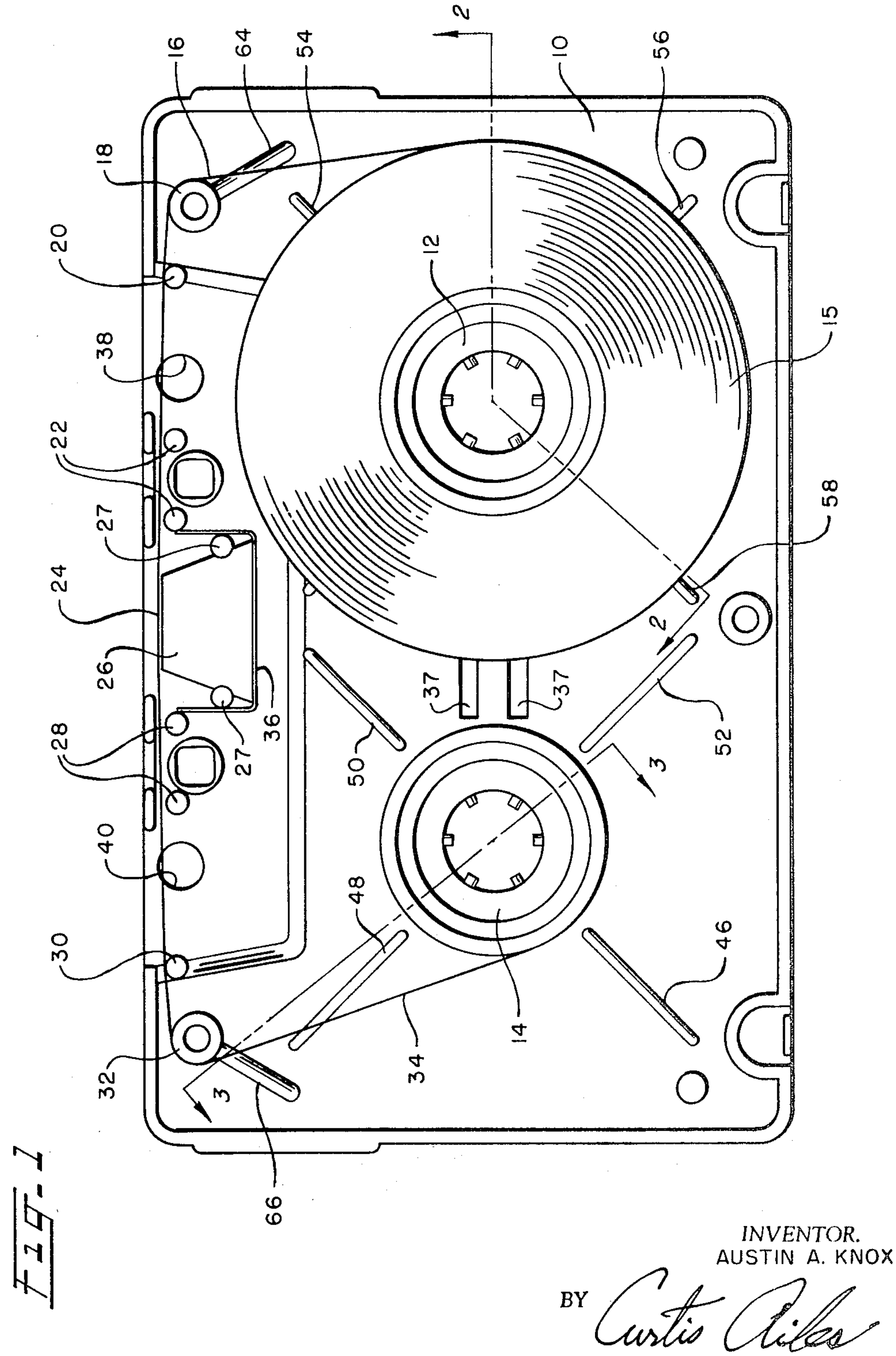
FIG. 1 is a top view of a magnetic tape cartridge in accordance with the invention, with the cover removed to display the operating parts.

Referring particularly to FIG. 1, there is shown a top view of a magnetic recording tape cartridge embodying the invention with the cover removed to expose the working parts. The embodiment illustrated is of the compact type which is often referred to as a "cassette." It includes a tape-housing or casing 10 having two tape reels therein which consist simply of hubs 12 and 14. These tape reels are referred to only as hubs because they do not include radial flanges which are commonly used for conventional tape or photographic film reels to enclose the tape on both sides as it is wound upon the reel.

In FIG. 1, the hub 12 is shown to be substantially full of tape 15, and the hub 14 substantially empty. The tape is as shown at 16, around a guide member 18, and over several guide members 20 and 22 to a magnetic head engagement position indicated at 24. At 24, the tape passes across an organic foam pressure pad 26 which is arranged to engage and hold the tape against an electromagnetic transducer (not shown) which is to be employed to record signals upon the tape, and to receive signals from the tape. Pad 26 is preferably a polyether type of polyurethane having 80 to 100 pores per square inch. Because of its trapezoidal cross-sectional shape, as illustrated, it is maintained in assembled relationship within casing 10 by resilient engagement of the inner corners against appropriate associated pins 27. The tip portion of pressure pad 26 engaging with the tape at 24 is preferably provided with a smooth slippery surface by means of a vinyl film attached to that surface by means of a pressure-sensitive adhesive.

Beyond the central position 24, the structure of the casing 10 is symmetrical, the tape being threaded over guide members at 28 and 30, over a guide pin 32, and thus at 34 to the takeup hub 14. After the tape is recorded or "played" it will be wound completely on the takeup hub 14 and completely unwound from hub 12. The cassette cartridge may then be removed from the machine and turned over. The operation can then be repeated on the second track of the tape, the hub them becoming the takeup hub, and the hub 14 the supply hub. Windows 37 in the casing provide a visual indication of the transfer of tape from one hub to the other. A magnetic shield is provided at 36 to shield against transfer of static noise by induction into the magnetic transducer which is at 24 when the cassette is in operating position. The chief source of such noise is generally the drive motor circuit of the tape recorder or player machine. Shield 36 is simply a U-shaped metal member which fits around pin 27 and forms a part of the finished casing 10. Shield 36 taken together with pins 27 forms a means for supporting and positioning the body of pressure pad 26 by engaging and confining the outer margins thereof and maintaining the body of the pressure pad under compression.

As illustrated in FIG. 1, each of the hubs 12 and 14 is provided with radially inwardly extending teeth at the inner diameter which are arranged to engage with splined shafts of the recorder drive mechanism. Openings are provided at 38 and 40 in the casing 10 for the admission of a drive capstan for the tape when the cassette is inserted and installed in the recorder. This drive capstan engages one side of the tape, and an associated driving wheel engages the other side, so as to provide a position drive for the tape at a constant speed to provide both recording and playback without distortion due to speed fluctuations.

Figure 2:
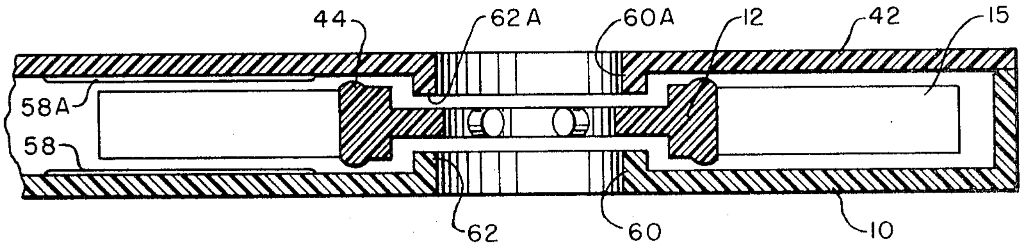
FIG. 2 is a sectional view taken at section 2—2 in FIG. 1, but illustrating the structure with the cover in place.

In prior magnetic tape cartridges of the cassette type in which the tape reels are merely hubs without radial flanges, it has been common to provide inside dimensions for the cassette casing such that the side edges of the tape, as wound upon the hub, are in frictional engagement with one side or the other of the inside of the casing. By contrast, it is an important feature of the present invention that the wound tape, such as the tape on the full hub 12 of FIG. 1, is axially spaced away from the inside wall of the casing 10 so that it is not in frictional engagement with that wall. FIG. 2, which is a sectional view, particularly illustrates this feature of the invention.

FIG. 2 is a sectional view taken at section 2—2 of FIG. 1. However, in FIG. 2, the cover member 42, omitted in FIG. 1, has been added. As indicated in FIG. 2, an outer rim portion 44 of the hub 12 has a greater width than the width of the tape 15. In accordance with the present invention it has been discovered that the roll of tape 15, if properly guided to the center of the hub 12, will be completely supported thereon by the frictional engagement of successive tape layers. Thus, the roll of tape 15 remains spaced away from the inside wall surface of the casing 10. Thus, the only friction resisting the rotation of the hub 12 is the friction due to the engagement of the lower edge of the rim 44 with the inside surface of the housing 10. This is essentially a constant friction since the frictional surfaces do not change in area. The only variable is the slight change in friction force due to the change in the weight of the tape 15 as the amount of tape which is wound upon the hub 12 changes.

If the cassette is subjected to a condition of extreme mechanical shock, it is possible for the roll of tape 15 to be displaced or "telescoped" to such an extent that at least a radially outer portion is positioned against the inner wall of either the casing 10 or the cover 42. In order to minimize the amount of friction to be overcome to rotate the hub in such a circumstance, the inner surface of the casing is provided with a number of narrow radially extending ribs shown in FIG. 1 at 46–58. These ribs are quite evident at 46–52, surrounding hub 14, since they are exposed. However, the corresponding ribs 54–58 under the full roll of tape 15 on hub 12 are almost completely hidden. A fourth rib is provided under roll 15 at the inside position near rib 50. A side elevation of rib 58 is shown clearly in FIG. 2. The ribs 46–58 are preferably radiused at their peaks and provide a smooth surface of limited area with a minimum of friction for engagement of the edges of the tape roll 15 if and when such tape roll becomes displaced. Ribs corresponding to the ribs 46–58 are provided on the inside surface of the cover 42, one of these ribs 58A being shown in FIG. 2.

In a typical embodiment of the present invention, the width of the tape 15, as illustrated in FIG. 2, is approximately 0.150 inch, the basic inside depth of the casing 10 from the inside surface of the cover 42 to the inside surface of the bottom wall of casing 10, as illustrated in FIG. 2 is 0.200 inch. The height of each of the ribs 46–58 is approximately 0.010 inch. The axial width of the rim portion 44 of the hub 12 is approximately 0.190 inch to provide a loose fit within the 0.200 inch inside depth of the casing 10. The result is that the typical space from the lower edge of roll 15 to the top of the rib 58 is approximately 0.010 inch. The space from the upper edge of roll 15 to the edge of rib 58A is about 0.020 inch. These spacings are reversed when the cartridge is turned over.

As further illustrated in FIG. 2, the casing 10 is provided with an opening for admission of the hub drive shaft at 60. A corresponding opening is provided in the cover 42 at 60A. At the opening 60, the casing is provided with an axially inwardly extending annular flange 62, and a corresponding flange 62A is provided in the cover 42. These flanges serve to center the hub 12 at the openings 60 and 60A by engagement with the enlarged outer rim portions of the hub whenever the hub becomes radially displaced.

Referring again to FIG. 1, the casing 10 includes tape guide ribs 64 and 66 to provide for the precise transverse positioning of the tape respectively as it is removed from the hub 12, and as it is wound upon hub 14. This transverse positioning of the tape is particularly important during the windup operation illustrated for hub 14. Reference is made to FIG. 3 to further illustrate this feature.

FIG. 3 is a partial cross-sectional view taken at section 3–3 of FIG. 1 to further illustrate features described above in connection with FIG. 2, and particularly to illustrate the operation of the tape guide rib 66. In FIG. 3, as in FIG. 2, the cover 42 has been illustrated. Cover 42 includes a tape guide rib 66A corresponding to the rib 66 of the casing 10, and these ribs are shown sectioned in FIG. 3. The ribs 66 and 66A are arranged at an angle, more or less transverse to the direction of the tape at 34, so that they are always in a position adjacent to the tape edge to guide the tape accurately to the axial center of the hub 14 as it is wound upon the hub.

In the typical embodiment for which dimensions are given above, a typical height or protrusion for the guide rib 66 above the main inner surface of casing 10 is 0.020 inch. The height of the corresponding rib 66A in the cover 42 is of the same dimension. Thus, with the example given, if the lower edge of the tape at 34 is guided at the upper edge of the rib 66, the tape is guided exactly to the axial center of the hub 14. This assumes that the hub 14 is axially biased downwardly by gravity so that the lower edge of the flange 44 is bearing against the inside surface of the casing 10. With this precise guidance and spacing of the tape upon the hub it is assured that, under normal circumstances, there will be a minimum clearance of 0.010 inch from the edge of the wound tape roll to the upper edges of the guide ribs 46–52. Accordingly, there will be no rubbing friction of the tape edges and the only friction resisting rotation of the tape rolls and the hubs 12 and 14 will be the friction of the hub rims at the axial edges where they engage the inside surface of the casing 10 (or the cover 42 when the cartridge is turned over for reverse operation).

Figure 4:
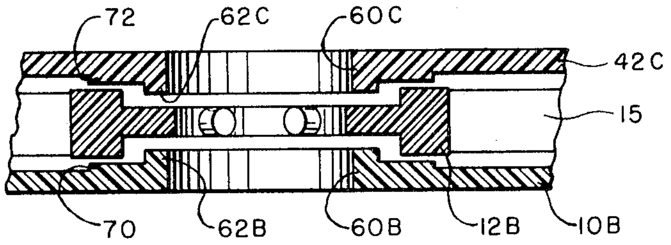
FIG. 4 is a sectional view corresponding to the sectional view of FIG. 3, but illustrating an alternative embodiment of the invention.

FIGS. 1, 2, and 3 all relate to a single preferred structural embodiment of the invention. FIGS. 4 and 5 illustrate alternative embodiments.

FIG. 4 is a sectional detail view generally corresponding to the sectional view of FIG. 2, but illustrating an alternative embodiment of the invention. In this embodiment, the maximum axial width of the hub 12B is approximately the same as the width of the magnetic recording tape 15. However, the axial centering of 12B within the casing 10B is accomplished by the provision of annular bosses 70 and 72 on the inner surfaces respectively of the casing 10B and the cover 42B. Thus, the principles of the present invention, and particularly the maintenance of a clearance space between the interior walls of the casing and the roll of magnetic tape, may be accomplished by providing a narrowing portion of the interior of the casing in the vicinity of the hub, as an alternative to the wide hub of FIG. 2.

FIG. 5 illustrates still another modification of the invention in which the axial positioning of the hub 12D is accomplished simply by enlarging the axial dimension of each of the annular flanges 62D and 62E to engage with the inner web portion of the hub 12D. These flanges 62D and 62E thus not only provide the function of radially centering hub 12D with respect to the casing opening 60D, but they also provide for axial positioning of the narrow hub 12B.

While the casing 10 and the cover 42 have been referred to as separate parts in the above description, it will be understood that these parts are intended to be combined and securely fastened together. The casing cover 42 is preferably bonded to the casing 10 by a fusion bonding procedure in which at least localized portions of both members are fused to form a secure unitary structure. Accordingly, they are sometimes referred to collectively below as constituting the casing.

Various materials may be employed for the casing and the hub 12 in the practice of the present invention. Preferably these materials are both organic plastic materials which are particularly chosen to provide low mutual friction and good wear properties. A very satisfactory material for the casing has been found to be polystyrene. The material for the hub 12 is preferably chosen from a group including the nylons, such as polyhexamethylene adipamide, or polycaprolactam, a polycarbonate, polytetrafluoroethylene, or combinations of two or more of the above materials. Polypropylene may also be employed as the material for the hub 12, particularly where the tape leader is to be fusion bonded to the exterior circumference of the hub in accordance with the teachings of my copending patent application Ser. No. 725,835 filed concurrently herewith and assigned to the same assignee as the present application. When polypropylene is employed for the hub 12, an additional means for reducing friction between the hub and the casing is preferably used. Such means may comprise a polytetrafluoroethylene coating applied to the outer edges of the flange of the hub, or to the portion of the inner surface of the casing engaging with the hub. Alternatively, a polytetrafluoroethylene film "washer" may also be inserted at the interior of the casing to serve as a low friction material between the hub and the inner casing surface.

While this invention has been shown and described in connection with particular preferred embodiments, various alterations and modifications will occur to those skilled in the art. Accordingly the following claims are intended to define the valid scope of this invention over the prior art, and to cover all changes and modifications falling within the true spirit and valid scope of this invention.

I claim:

1. A magnetic recording tape cartridge including an outer casing for enclosing the magnetic tape and a tape reel supported within said casing which consists only of a hub having a cylindrical outer rim without radial side flanges, wherein said casing has substantially parallel inner surfaces spaced apart by a dimension substantially greater than the width of the magnetic tape, said casing including integral guide means for the magnetic tape to center the tape as it is wound upon the outer rim of said hub so that the wound tape is spaced away from said parallel inner surfaces, said casing including means for radially centering the hub, the axial dimension of a predetermined annular portion of said hub being only slightly smaller than the dimension between the portions of the inside surfaces of said casing adjacent to said predetermined annular portion of said hub to provide a loose supporting fit for said hub, said dimension between the portions of the inside surfaces of said casing adjacent to said predetermined annular portion of said hub being substantially equal to said dimension between said substantially parallel inner surfaces of said casing, said predetermined annular portion of said hub having an axial dimension substantially greater than the width of the magnetic tape and only slightly smaller than said dimension between said substantially parallel inner surfaces of said casing.

2. A tape cartridge as claimed in claim 1 wherein said predetermined annular portion of said hub is the portion having the largest axial dimension of said hub.

3. A tape cartridge as claimed in claim 1 wherein said predetermined annular portion of said hub comprises the outer rim portion thereof.

4. A tape cartridge as claimed in claim 1 wherein said means for radially centering said hub comprise inwardly extending annular flange portions of said casing, said hub having enlarged rim portions engaging with said annular flange portions of said casing.

5. A tape cartridge as claimed in claim 1 wherein portions of said parallel inner surfaces of said casing include narrow ribs generally radially extending towards the space to be occupied by said tape to provide a low friction limited area bearing surface for said tape whenever said tape becomes telescoped on said hub.

6. A magnetic recording tape cartridge including an outer casing for enclosing the magnetic tape and a tape reel supported within said casing which consists only of a hub having a cylindrical outer rim without radial side flanges, wherein said casing has substantially parallel inner surfaces spaced apart by a dimension substantially greater than the width of the magnetic tape, said casing including integral guide means for the magnetic tape to center the tape as it is wound upon the outer rim of said hub so that the wound tape is spaced away from said parallel inner surfaces, said casing including means for radially centering the hub, the axial dimension of a predetermined annular portion of said hub being only slightly smaller than the dimension between the portions of the inside surfaces of said casing adjacent to said predetermined annular portion of said hub to provide a loose supporting fit for said hub, said predetermined annular portion of said hub being provided with a curved edge portion when viewed in radial cross section to thereby provide a small area of contact with the adjacent portions of the inner surface of said casing.

7. A magnetic recording tape cartridge including an outer casing for enclosing the magnetic tape, a pressure pad and a tape reel supported within said casing, which consists only of a hub having a cylindrical outer rim without radial side flanges, wherein said casing has substantially parallel inner surfaces spaced apart by a dimension substantially greater than the width of the magnetic tape, said casing including integral guide means for the magnetic tape to center the tape as it is wound upon the outer rim of said hub so that the wound tape is spaced away from said parallel inner surfaces, said casing including means for radially centering the hub, the axial dimension of a predetermined annular portion of said hub being only slightly smaller than the dimension between the portions of the inside surfaces of said casing adjacent to said predetermined annular portion of said hub to provide a loose supporting fit for said hub, said pressure pad consisting of a body of resilient solidified organic foam material having an appreciable thickness and having a tip portion arranged for engagement with the magnetic tape, said body of foam material being arranged to be deformed in compression to provide a resilient force to bias the magnetic tape against a magnetic transducer, said body of foam material including a base portion opposite to said tip portion, said base portion being larger than said tip portion, said casing including means for supporting and securing said body of foam material therein comprising opposed pins within said casing for engaging and confining the outer margins intermediate of said base and tip portions and spaced together by a dimension less than the uncompressed dimension of the base of said body to compress said body.

* * * * *